United States Patent [19]

English

[11] 4,166,546
[45] Sep. 4, 1979

[54] AUTOMOBILE PARKING SYSTEM

[76] Inventor: Ralph M. English, 2315 Lincoln Ave., San Diego, Calif. 92104

[21] Appl. No.: 859,798

[22] Filed: Dec. 12, 1977

[51] Int. Cl.² ............................................. E04H 6/06
[52] U.S. Cl. ..................................... 414/263; 104/44; 414/246
[58] Field of Search ................. 214/16.1 R, 16.1 CC, 214/16.1 CE; 104/44, 48, 49

[56] References Cited

U.S. PATENT DOCUMENTS

| | | | |
|---|---|---|---|
| 1,969,419 | 8/1934 | Martin | 214/16.1 CC |
| 2,785,809 | 3/1957 | Riblet | 104/44 X |
| 3,190,467 | 6/1965 | English | 214/16.1 CE |
| 3,191,782 | 6/1965 | Pernum | 104/44 X |
| 3,674,158 | 7/1972 | Owen | 214/16.1 CE |
| 3,746,191 | 7/1973 | Bianca | 214/16.1 CC |

FOREIGN PATENT DOCUMENTS

| | | | |
|---|---|---|---|
| 2254960 | 5/1974 | Fed. Rep. of Germany | 214/16.1 CE |
| 1336232 | 6/1963 | France | 214/16.1 CE |

Primary Examiner—Francis S. Husar
Assistant Examiner—Terrance L. Siemens
Attorney, Agent, or Firm—Frank D. Gilliam

[57] ABSTRACT

A system for parking and storing automobiles in which automobiles are moved from a loading station to an elevator to stacked parking spaces under remote control. The system includes a turntable means which permits the automobile to be driven onto a parking pallet in a forward direction, and allows easy, safe egress by the driver. The turntable is rotated and cam arm means delivers the pallet to an elevator means which raises the pallet to a selected unoccupied parking space, exchanges the loaded pallet for an empty pallet from the parking space, then returns the pallet to the loading turntable. Similarly, the elevator means can, by remote control, retrieve the loaded pallet and return it to the turntable. The turntable operates to deliver the automobile to the driver in a manner permitting easy and safe entry by the driver and which permits him to drive away in a forward direction.

3 Claims, 12 Drawing Figures

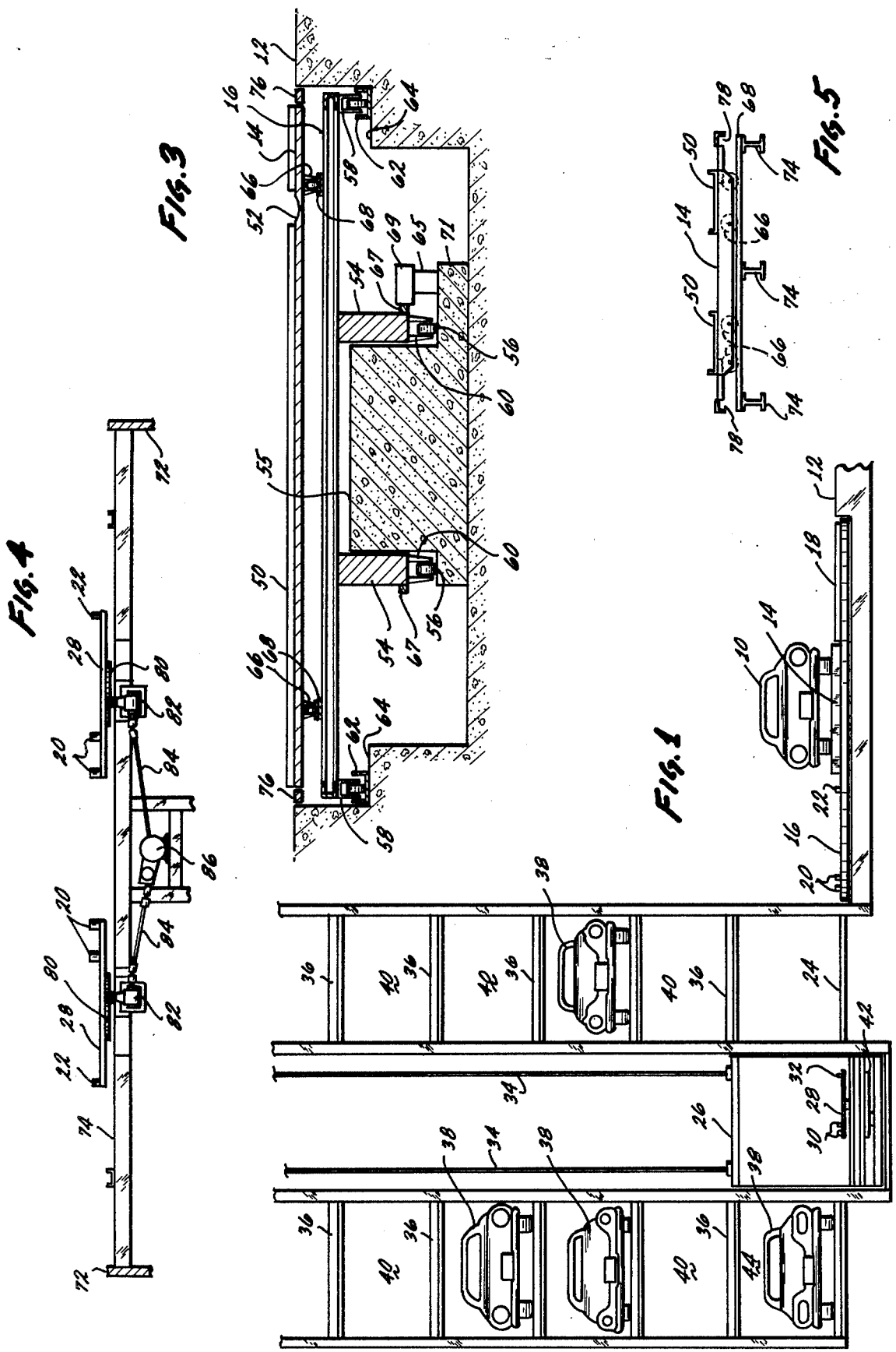

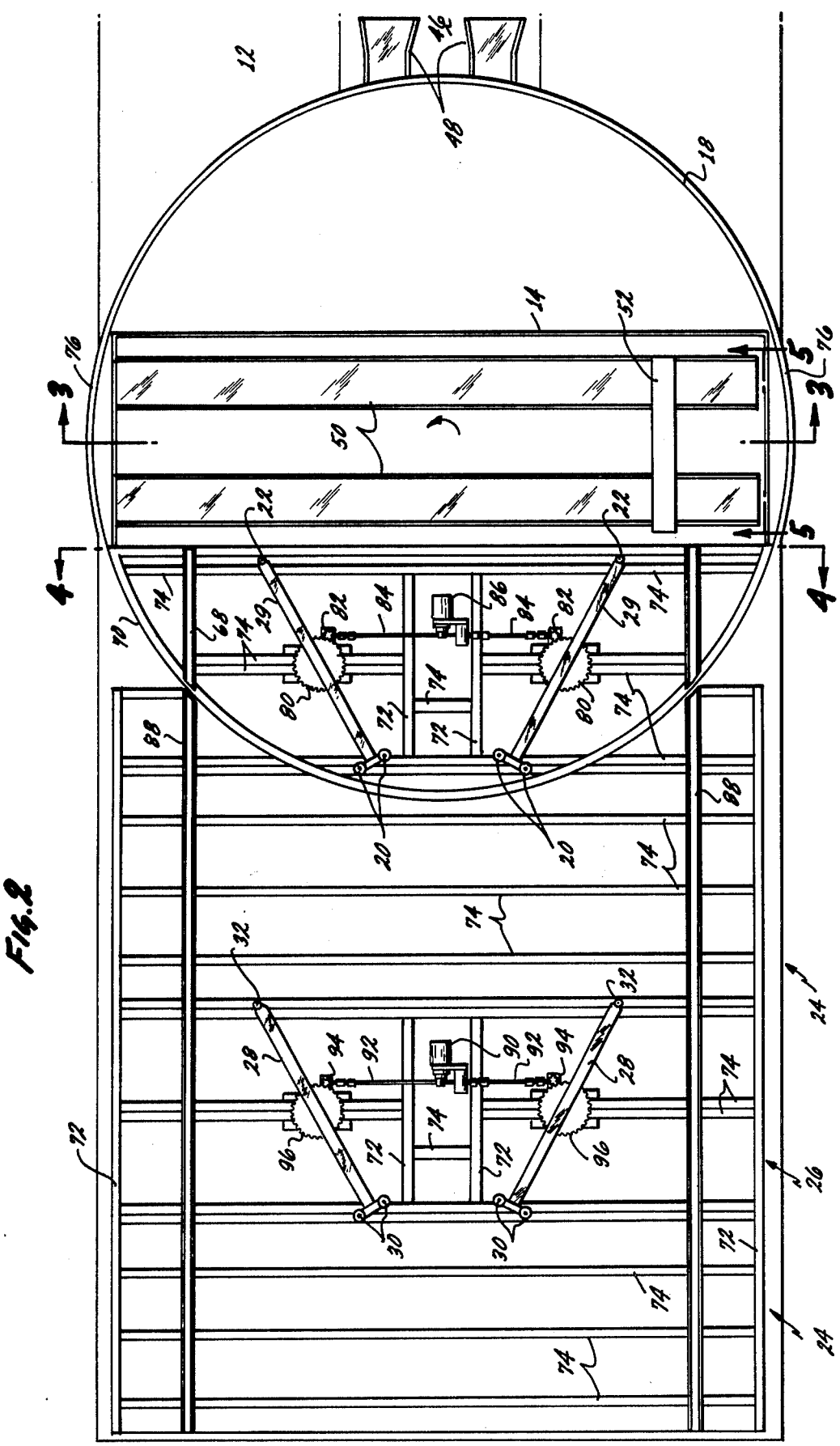

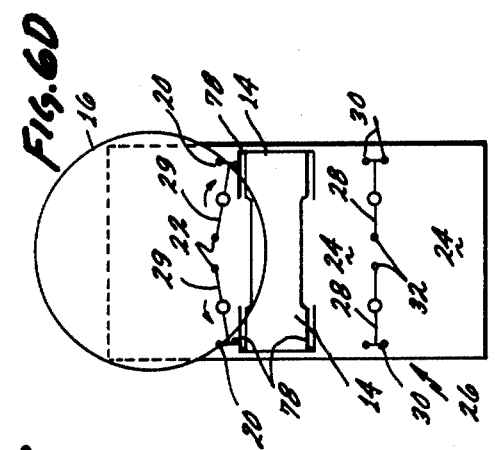
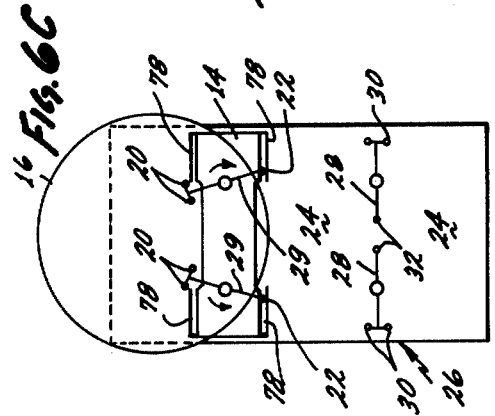
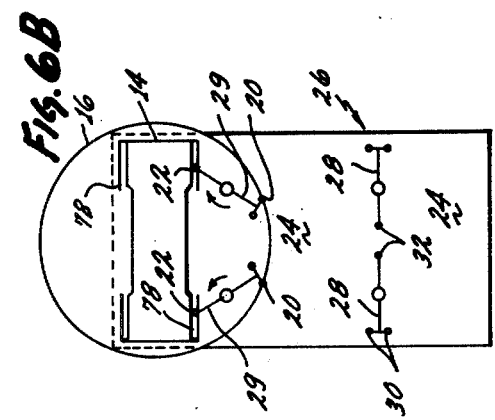
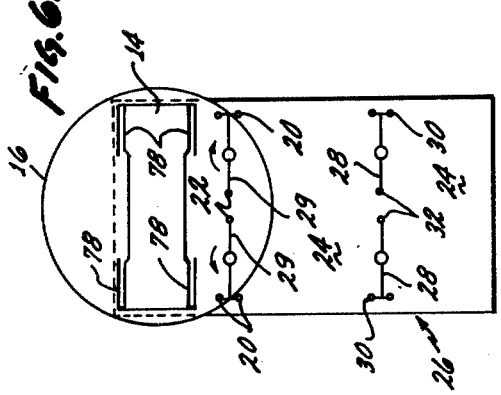
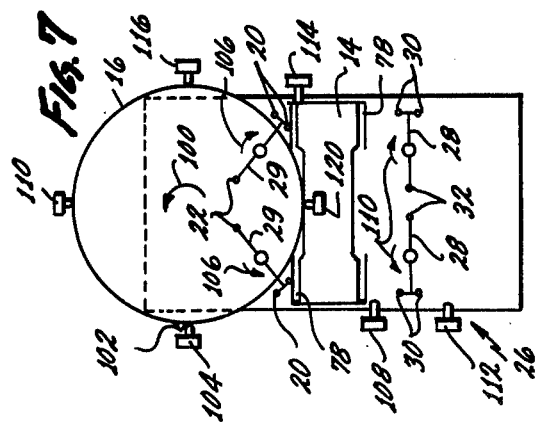
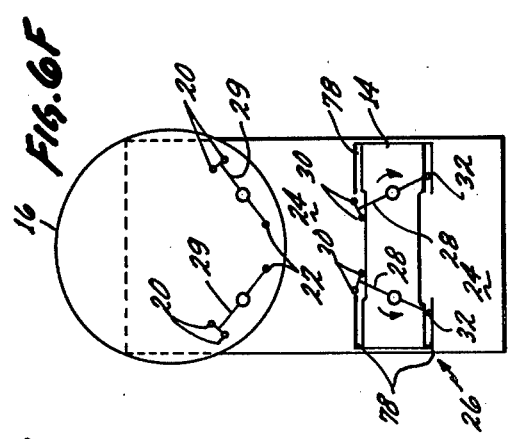
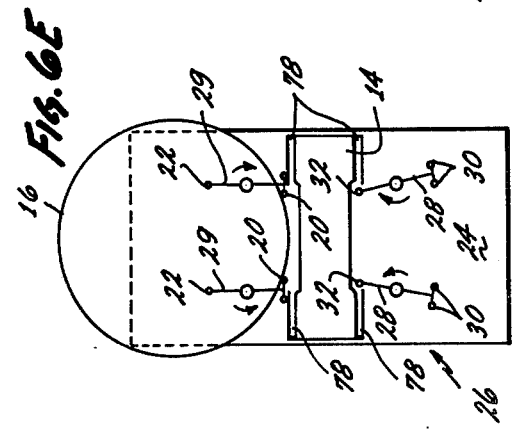

AUTOMOBILE PARKING SYSTEM

BACKGROUND OF THE INVENTION

This invention relates in general to arrangements for parking or storing automobiles and, more specifically, to a system which parks automobiles in stacked spaces, utilizing an elevator means and a novel turntable arrangement for receiving, parking and returning automobiles by remote control.

Parking of automobiles for variable time periods in shopping, apartment and business areas is becoming an increasing problem. Surface level parking is increasingly costly, due to the large areas of ever more expensive land tied up in parking lots, plus the high labor cost of attended lots. Self-service lots have several problems, including collision damage to automobiles and theft from the easily accessible unattended automobiles.

Attempts have been made to design "high-rise" parking lots in which automobiles are either driven up a ramp or raised by elevators. Ramp-type lots have the same collision damage and theft problems as surface lots, plus the wasted space occupied by the ramp. Lots using elevators to lift automobiles to elevated parking spaces tend to be complex and to require attendants to move automobiles between entry locations, the elevators, and the parking spaces, resulting in high labor costs.

In my prior U.S. Pat. No. 3,190,467, I describe a high-rise parking system overcoming many of these problems. In my system, automobiles are driven onto movable pallets which are moved by remote or automatic control onto elevators. The elevators move to positions adjacent to elevated parking spaces, then transfer means exchanges the loaded pallet for an empty pallet in the space. These operations are reversed to retrieve the automobile. While this system is highly effective, I have found that certain problems remain in receiving the automobile from the driver and moving it to the elevator and later in returning the automobile to the driver from the elevator. As disclosed in my prior patent, the automobile is driven onto a pallet near and parallel to the elevator. Little room is provided for the driver in getting out of his automobile and walking out of the parking building. Also, the automobile is returned to the driver in the same orientation on the pallet, so that the driver must back off of the pallet, resulting in some danger and inconvenience. Fee parking lots must be as safe and convenient as possible if maximum utilization is to be achieved.

It is, therefore, an object of my present invention to provide a parking system overcoming the above-mentioned problems.

Another object of this invention is to provide a parking system which is an improvement on that described in my U.S. Pat. No. 3,190,467.

A further object of this invention is to provide a parking system which permits the driver to easily and safely leave or enter his automobile at the entrance location of the parking system.

Yet another object of this invention is to provide a parking system in which the driver may drive in a forward direction both when entering and when leaving the entrance of the parking system.

Still a further object of this invention is to provide a parking system in which one entrance location can supply automobiles to more than one elevator.

SUMMARY OF THE INVENTION

The above objects, and others, are accomplished in accordance with this invention by an improved automobile parking system having a turntable system carrying a movable pallet to receive automobiles to be parked. The turntable includes means for supporting a pallet at approximately the center of the turntable. The turntable is initially oriented with one end pointed toward the parking building entrance. A driver drives through the entrance and directly onto the pallet. A walkway platform is located on the turntable flush with the surrounding floor and driveway surface on the driver's side of the automobile. The driver steps from his automobile and can safely and easily walk back to the building entrance. Any passengers preferably leave the automobile just prior to driving the automobile onto the pallet. Drive means are provided to rotate the turntable (generally about 90°) to position the loaded pallet to a position parallel to the adjacent elevator. Cam arms on said turntable move the loaded pallet sidewise to a location next to the elevator. Cam arms on the elevator then move the loaded pallet onto the elevator. The elevator then delivers the loaded pallet to the space next to the elevator in the manner described in my U.S. Pat. No. 3,190,467. The cam arms on the turntable move the empty pallet onto the turntable, which rotates back to the original position to receive another automobile.

To retrieve a parked automobile, the empty turntable is rotated to place the empty pallet thereon parallel to the elevator. The turntable cam arms move the empty pallet to the position next to the elevator, then the elevator cam arms move it onto the elevator. The elevator mechanisms then exchange the empty pallet for the desired loaded pallet and return it to the space next to the elevator. The turntable cam arms move the loaded pallet onto the turntable, which then makes an additional rotation (typically, an additional 90°) so that the automobile is headed toward the entrance. The driver walks to the automobile safely and easily over the turntable platform which is again adjacent to the driver's side. After the automobile is driven in a forward direction off of the pallet and turntable, the turntable rotates (about 180° in either direction) and is ready to receive another automobile to be parked.

If desired, a conveyor means, such as additional sets of cam arms, can be provided to move pallets past the first elevator to additional sets of elevators and parking space stacks located in series past the first set. Thus, one turntable system can serve a plurality of elevators.

Since the present invention is an improvement on the system disclosed in my U.S. Pat. No. 3,190,467, the disclosure of that patent is incorporated by reference. For clarity, only those portions of that patent will be described herein as are necessary for a complete understanding of this invention. Of course, those skilled in the art will realize that the turntable system of this invention can be adapted to other high-rise parking systems.

BRIEF DESCRIPTION OF THE DRAWINGS

Details of the invention, and of a preferred embodiment thereof, will be further understood upon reference to the drawing, wherein:

FIG. 1 is a front elevation view showing the basic structure of the automobile parking system of this invention;

FIG. 2 is a plan view showing the turntable, adjacent space, and elevator;

FIG. 3 is a section view taken on line 3—3 in FIG. 2, showing the turntable support and drive means;

FIG. 4 is a section view through the turntable taken on line 4—4 in FIG. 2, showing the cam arm mechanism;

FIG. 5 is an elevation view of the end of a typical pallet;

FIG. 6A through 6F are schematic representation of the sequence of pallet movement and cam arm operation; and FIG. 7 is a schematic representation of pallet movement switch operation.

DETAILED DESCRIPTION OF THE INVENTION

Referring now to FIG. 1, there is seen a simplified elevation view of the parking system of this invention. An automobile 10 is driven through an entrance over entry roadway 12 from the right as seen in FIG. 1 onto a pallet 14 on turntable 16. The driver steps out onto platform 18 on the driver's side of turntable 16. Turntable 16 is then rotated counterclockwise 90° to the position seen in FIG. 1. A cam arm 29 mounted within turntable 16 has upstanding cams 20 and 22 at the ends which engage cam brackets (not shown, described in detail below) to move pallet 14 across the side of turntable 16 opposite platform 18 into space 24. An elevator 26 is positioned adjacent to space 24. A set of cam arms 28 having upstanding cams 30 and 32 moves pallet 14 into elevator 26. As seen in FIG. 1, some parking spaces contain parked automobiles 38, while spaces 40 are empty.

Elevator 26 is raised by conventional means, such as cables 34 to a position adjacent to an empty parking space. As described in detail in my U.S. Pat. No. 3,190,467, an empty pallet 36 in an unoccupied parking space is moved into a lower slot in the floor of elevator 26 by a second cam assembly 42. The loaded pallet 14 is moved into the empty space 40 by cam arms 28. Elevator 26 may pick up a different automobile and deliver it to turntable 16, or may return an empty pallet 36 to turntable 16 so that another automobile may be parked.

If desired, a second set of elevator and associated parking space stacks may be placed next to the stack shown in FIG. 1, opposite turntable 16. In that case, space 44 will contain neither the automobile nor an empty pallet. As described in my U.S. Pat. No. 3,190,467, cam arm 28 in elevator 26 is capable of moving a loaded pallet into space 44. Then, any suitable conveyor means, such as another cam arm assembly, may be provided to move the loaded pallet from space 44 to the next elevator. Thus, if desired, one turntable 16 and automobile receiving entrance may serve one, two or more sets of elevators and parking space stacks.

Details of the turntable and associated mechanisms for receiving an automobile to be parked and moving it to an elevator are shown in FIGS. 2 and 3.

Entry roadway 12 includes a marked, such as by painted lines, driveway 46 having a pair of tapered channel members 48 to guide an entering automobile into channels 50 on pallet 14. Of course, pallet 14 is rotated clockwise 90° from the position shown in FIG. 2 before the automobile is driven onto pallet 14. As the driver drives along pallet 14, the front wheels enter a slight depression or transverse groove 52. When the driver feels his wheels enter depression 52, he sets his parking brake and steps out onto platform 18 and leaves the area. While in countries such as the United States with left-hand drive, platform 18 is to the left of the automobile, in countries such as Great Britain, platform 18 would be on the right side of the automobile. Pallet 14 is somewhat longer than the average automobile to accomodate automobiles of varying lengths.

Once the driver leaves platform 18, turntable 16 is rotated 90° counterclockwise to the position shown in FIG. 2. As seen in FIG. 3, turntable 16 is mounted on a tubular member 54 which surrounds a stationary cylindrical member or hub 55 which acts as a central bearing during turntable rotation. Turntable 16 is supported by a first set of casters 56 attached to tubular member 54 which ride on a shoulder 60 around cylinder 55, and a second set of casters 58 attached near the rim of turntable 16 and which ride in a circular channel 62 on a ledge 64 around the edge of the turntable. Pallet 14 is mounted on casters 66 which ride in channels 68 for transverse movement across turntable 16.

Turntable 16 is rotated by a reversible motor 65 driving a large ring gear 67 around tubular member 54 through gear box 69. Motor 65 is mounted on a small extension 71 of shoulder 60.

Returning to FIG. 2, it is seen that turntable 16 is formed basically from an open truss framework made up of a plurality of truss members including a circular rim 70, crosspieces 72 and longitudinal pieces 74. Pallet caster channels extend from under pallet 14 to the rim member 70. Platform 18 is fastened to the top of the truss substrate of turntable 16. Small platform pieces 76 fill in at the ends of pallet 14. The area of the cam arm mechanism 29 is left open for operation of the mechanism and to prevent anyone from trying to enter the parking area. Ladders and walkways (not shown) may be provided for maintenance of the system. Security of the parked automobiles may be easily maintained by locking any access doors to the maintenance walkways.

As discussed in detail below, cams 22 on cam arms 29 engage cam brackets 78 (as seen in FIG. 5) along the end portions of the sides of pallets 14.

As seen in FIGS. 2 and 4, cam arms 29 are caused to rotate in either direction by means of gears 80, driven through gear boxes 82 and shafts 84 by motor 86. As the cam arm mechanism is operated, pallet 14 is rolled to the left as seen in FIG. 2 along channels 68 to the edge of turntable 16, whereupon the pallet casters enter channels 88 mounted on truss members 74 and the pallet enters space 24 (as seen in FIG. 1). Then cam arm mechanism 29 is inactivated and elevator cam arm mechanism is activated. These two cam arm mechanisms are basically similar. Motor 90 drives cam arms 28 through shafts 92, gear boxes 94 and gears 96. A cam drum 98 is coupled to one gear box 94 to operate a switch assembly in the manner described in my U.S. Pat. No. 3,190,467. Cam arm assembly 28 is operated, as discussed in detail below, so that cams 32 engage cam brackets 78 under pallet 14 to move the pallet onto elevator 26. The elevator may then be operated to deliver the loaded pallet 14 to an empty storage space and retrieve either an empty pallet 36 or one bearing an automobile to be retrieved.

When elevator 26 returns to the ground level, elevator cam arm mechanism 28 is operated to move the pallet into space 24 next to turntable 16. Turntable cam arm mechanism 29 is operated to move the pallet from space 24 to the center of turntable 16. If the pallet is empty, turntable 16 is rotated 90° clockwise so as to be ready to receive another automobile to be parked. If pallet 14 carries an automobile being retrieved, turntable 16 will instead be rotated 90° counterclockwise. The driver can then safely and easily walk across platform 18, enter his automobile and drive away across driveway 46 in a safe and convenient forward direction. The turntable can then be rotated 180° in either direction so as to bring pallet 14 into position ready to receive another automobile to be parked.

The several steps in the operation of turntable cam arm mechanism 29 and elevator cam arm mechanism 28 to move pallets 14 between turntable 16 and elevator 26 are schematically illustrated in FIGS. 6A through 6F.

After an automobile is driven onto pallet 14, turntable 16 is rotated to the position shown in FIG. 6A. Cam arms 29 are activated and begin to rotate in the directions indicated by the arrows near the hubs of arms 29.

As illustrated in FIG. 6B, cams 22 enter cam brackets 78 and, as arms 29 continue to rotate, pallet 14 is drawn from the center of turntable 16 to a position over cam arms 29.

FIG. 6C shows the completion of this movement, with cams 22 leaving cam brackets 78 and cams 20 just coming into contact with the outer surfaces of the opposite cam brackets 78.

As illustrated in FIG. 6D, continued rotation of arms 29 causes cams 20 to push pallet 14 into space 24 between turntable 16 and elevator 26.

As cams 20 complete their operation on pallet 14, as shown in FIG. 6E, cam arms 28 on elevator 26 are activated and cams 32 begin to move in the direction indicated by the arrows near the hubs of arms 28. Cams 32 enter cam brackets 78 and draw pallet 14 onto elevator 26.

As shown in FIG. 6F, cam arms 29 are stopped in a suitable position awaiting the return of a pallet 14. Once pallet 14 is fully positioned on elevator 26, the elevator will rise to a position adjacent to an empty parking space, and the empty pallet in that space will be moved onto the elevator's lower level. Cam arms 28 are operated in one direction or the other to move the loaded pallet 14 into the empty space. The empty pallet may then be returned to turntable 16 by reversing the above described sequence of operations. Alternatively, the elevator may exchange the empty pallet for a loaded pallet carrying an automobile to be retrieved and return the loaded pallet to turntable 16. Operation of the elevator, which is not part of the present invention, is described in detail in my U.S. Pat. No. 3,190,467.

The various operations described above can be caused to take place in any desired manner. An operator positioned where he can observe the system in operation could manually operate switches causing each of the mechanisms to start and stop when necessary and to reverse the direction of rotation of the various motors when desired or necessary. Such a system would be relatively inexpensive initially, but would have higher labor costs. The opposite extreme from such a manual system would be a conventional microprocessor and appropriate servo mechanisms programmed to operate the various subsystems in the desired manner as governed by suitable sensors and timers. An intermediate system, using limit switches, is schematically illustrated in FIG. 7.

After a driver leaves an automobile on pallet 14 and leaves the platform, he presses a button or turns a key switch, starting turntable 16 rotating in a counterclockwise direction as indicated by arrow 100. If desired, a pressure actuated switch could be embedded in driveway 46 adjacent to turntable 16 to automatically start system operation when an automobile is driven onto the turntable. When turntable 16 reaches the position shown in FIG. 7, a cam actuator 102 actuates a limit switch 104 to stop the turntable motor and start cam arms 29 rotating in the direction indicated by arrows 106. As pallet 14 completes its movement toward elevator 26, pallet 14 actuates a switch 108 which turns off cam arms 29. If desired, a delay means can be included to allow cam arms 29 to continue rotation for a short distance. Switch 108 also actuates cam arms 28 which begin to rotate in the direction indicated by arrows 110. When arms 28 have drawn pallet 14 fully onto elevator 26, the pallet contacts switch 112 which initiates the elevator operation sequence, which is detailed in my U.S. Pat. No. 3,190,467.

Later, when elevator 26 returns a pallet 14 and moves it into the space next to elevator 26, pallet 14 operates switch 114 which turns off arms 28 and actuates cam arms 29, which now rotate in a direction opposite to arrows 106. When pallet 14 is returned to the center of turntable 16, switch 116 is actuated, stopping the rotation of arms 29 and starting turntable 16 rotating in a direction opposite to arrow 100. When cam actuator 102 actuates switch 118, turntable 16 is stopped and pallet 14 is ready to receive another automobile.

If, instead, an automobile is being retrieved, the driver starts the retrieval sequence by operating another switch which begins system operation. The sequence is the same as that described above in parking an automobile, except that the empty pallet 14 from turntable 16 is exchanged for a loaded pallet in a parking space. In this case, when the loaded pallet is returned to turntable 16, the driver operated switch causes turntable 16 to rotate in the direction indicated by arrow 100. Turntable rotation is stopped when cam actuator 102 contacts switch 120. When the driver drives off of pallet 14, a pressure actuated switch in the driveway (not shown) can start turntable 16 rotating in the direction indicated by arrow 100, with rotation stopping when cam actuator 102 reaches switch 118. Again, the system is ready to receive another automobile for parking.

Certain specific arrangements and proportions have been set forth in the above description of a preferred embodiment. These may be varied, where suitable, within the scope of this disclosure. For example, additional sets of elevator shaft and parking space stacks may be placed adjacent to the set shown in FIG. 1 opposite to turntable 16, with additional cam arm mechanisms or other conveyor means to move pallets through the first elevator shown to adjacent elevators.

In a commercial parking building, an attendant can be located in a booth located above the turntable, with money and tickets exchanged with drivers through pneumatic tubes. The attendant would be secure from robbery, could observe the entire system in operation and could easily operate a control panel operating the system. In another alternative, where the parking system serves an apartment building, operation of the system can be computerized and a resident can park his automobile or retrieve it by punching appropriate codes on numbered buttons on a computer control panel near the turntable for fully automatic operation.

Other variations, applications an ramifications of the present invention will occur to those skilled in the art upon reading the present disclosure. These are intended to be included within the scope of this invention, as defined in the appended claims.

Having thus described the invention, which is claimed as new and useful and desired to be secured by the United States Letters Patent,

What is claimed is:

1. Automobile parking system turntable means movable among loading, storage transfer and unloading positions which comprises:

a generally flat circular turntable;

means supporting said turntable for rotation in a generally horizontal plane;

pallet support means at substantially the top center of said turntable supporting a rectangular pallet capable of carrying an automobile, said pallet support means including at least two channels adapted to guide rollers on the underside of said pallet from the center of said turntable off of said turntable in a direction generally perpendicular to the side of an automobile on said pallet;

a platform secured to said turntable on the driver's side of an automobile on said pallet adapted to allow a driver to enter and leave the automobile across said turntable;

pallet moving means on the side of said turntable top opposite to said platform, said pallet moving means comprising at least one cam arm mounted for rotation about the arm center in a horizontal plane below the plane of said pallet, an upstanding cam at one end of said cam arm and two upstanding spaced cams at the other end of said cam arm, said cams adapted to engage downwardly extending cam brackets on said pallets, so that said pallet may be moved across said pallet support means as said cam arm is rotated; and drive means for rotating said turntable among a first position where an automobile may be driven in a forward direction from an entrance road onto an empty pallet on said pallet support means, a second position where said pallet may be moved on or off said turntable by said pallet moving means and a third position where an automobile may be driven in a forward direction from a loaded pallet on said pallet support means onto said entrance road.

2. The automobile parking system turntable means according to claim 1 where said means supporting said turntable comprises a first plurality of downwardly extending casters around the rim of said turntable, said casters riding on a circular ledge below the turntable rim, a tubular member extending downwardly at the turntable center surrounding a stationary hub, and a second plurality of casters extending downwardly from said tubular member riding on a circular shoulder around said hub.

3. The automobile parking system turntable means according to claim 1 wherein said pallet includes two spaced channels on the upper surface thereof adapted to guide the wheels of an automobile being driven therealong and a shallow transverse depression in the pallet surface at the desired front wheel position for parking, said depression adapted to hold the automobile against accidental movement and to indicate to the driver that the automobile is in the correct position.

* * * * *